United States Patent [19]

Gardikes et al.

[11] 3,917,558

[45] Nov. 4, 1975

[54] FOUNDRY RESINS TREATED WITH NITRO COMPOUNDS

[75] Inventors: John J. Gardikes, Worthington; Young D. Kim, Columbus, both of Ohio

[73] Assignee: Ashland Oil, Inc., Ashland, Ky.

[22] Filed: Apr. 1, 1974

[21] Appl. No.: 456,594

[52] U.S. Cl.................. 260/38; 260/37 R; 260/59; 260/67 FA; 260/67 FP; 164/43; 260/DIG. 40
[51] Int. Cl.² .................... C08K 5/32; C08L 61/34
[58] Field of Search ........ 260/632 N, 638 N, 637 P, 260/67 FP, 67 FA, 69 R, 70 R, 59 R, 37 R, 38, DIG. 40; 164/43

[56] References Cited

UNITED STATES PATENTS

| | | | |
|---|---|---|---|
| 2,314,308 | 3/1943 | Ellis | 260/59 R |
| 2,553,386 | 5/1951 | Scott et al. | 260/70 R |
| 3,184,814 | 5/1965 | Brown | 260/DIG. 40 |
| 3,534,112 | 10/1970 | Tindall | 260/638 N |

*Primary Examiner*—Donald E. Czaja
*Assistant Examiner*—S. M. Person
*Attorney, Agent, or Firm*—Van D. Harrison, Jr.

[57] ABSTRACT

Nitro compounds (for example, nitromethane) are added to synthetic resins to reduce the concentration of free formaldehyde present therein.

19 Claims, No Drawings

FOUNDRY RESINS TREATED WITH NITRO COMPOUNDS

FIELD OF INVENTION

This invention relates to synthetic resin compositions containing unreacted (free) formaldehyde. In still another aspect the invention relates to foundry molding compositions which are combinations of foundry sand and a thermosetting resin binder and which contain unreacted formaldehyde. In another aspect this invention relates to a method of minimizing the free formaldehyde present in a synthetic resin composition, particularly those used as foundry binders.

BACKGROUND OF THE INVENTION

In the foundry art, cores and molds used to make metal castings generally are prepared by curing shaped mixtures of aggregate materials (sand) and a binder. A number of types of binders have been prepared and used such as synthetic resins derived in part from formaldehyde. These resins include phenol-formaldehyde, phenol-urea-formaldehyde, furfuryl alcohol-formaldehyde, and furfuryl alcohol-urea formaldehyde resins. The phenol-formaldehyde-furfuryl alcohol resins catalyzed with phosphoric and sulphuric acids are useful as no-bake binders. Phenol- and phenol-urea-formaldehyde resins, as well as the furfuryl alcohol resins, also are used in "hot-box" core making. These resins ordinarily are supplied as viscous liquids which, depending upon the process used, are mixed with foundry sand, catalyst, and other desired ingredients. The foundry mixture is molded in a core box and the resulting core is cured either through catalysts present in the mixture and/or by heating, as in the hot-box process. Those resins derived in part from formaldehyde ordinarily contain appreciable concentrations of free or unreacted formaldehyde. This unreacted formaldehyde is particularly undesirable when the resins are used to make foundry cores from sand. Formaldehyde is evolved either during mixing with the foundry aggregate or subsequently during heat curing of the shaped cores and molds. The odor of formaldehyde is unpleasant and irritating. Formaldehyde vapors are a hazard to persons continually exposed to such vapors.

OBJECTS OF THE INVENTION

An object of this invention, therefore, is to provide formaldehyde-derived resin compositions wherein the amount of free formaldehyde present is minimized.

Still another object of this invention is to provide a method of treating a resin to minimize the free formaldehyde content therein.

Another object of this invention is to provide a method of forming sand cores from foundry aggregate and a binder resin wherein the free formaldehyde content of the binder is minimized.

Still another object of this invention is to provide a foundry aggregate-resin binder composition wherein the free formaldehyde content has been minimized.

SUMMARY OF THE INVENTION

Briefly stated, our invention, in one aspect, comprises the synthetic resin product resulting from adding to a synthetic resin containing free or unreacted formaldehyde a nitro compound having the general formula

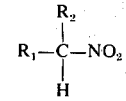

wherein H is hydrogen and $R_1$ and $R_2$ are hydrogen, hydrocarbon radicals, or members of the same ring. Preferably $R_1$ and $R_2$ are both hydrogen. In another aspect our invention comprises a foundry mix for making shaped foundry cores comprising foundry aggregate (such as sand) and the binder resulting from reacting a resin containing free or unreacted formaldehyde with a nitro compound having the general formula shown above. In still another aspect our invention constitutes a process for preparing shaped foundry cores which comprises: forming a foundry mix by uniformly distributing on a foundry aggregate a binding amount of a resin product derived from reacting a synthetic resin containing unreacted formaldehyde with a nitro compound having the general formula given above; forming the foundry mix into a shaped form and curing said form to a solid mass. The weight of resin product incorporated into the foundry mix will be up to about 10 percent of the weight of aggregate used, that is, for every hundred parts by weight of foundry sand used, up to about 10 parts by weight of binder will be used.

DESCRIPTION OF THE INVENTION

Ordinarily the synthetic resin containing free or unreacted formaldehyde which is reacted with a nitro compound can be any of the resin binders resulting from the reaction of a stoichiometric excess of formaldehyde with phenol, urea and/or furfuryl alcohol. Those resins which can be utilized in our invention include furfuryl alcohol-formaldehyde, urea/furfuryl alcohol-formaldehyde, phenol/furfuryl alcohol-formaldehyde, phenol-/urea/furfuryl alcohol-formaldehyde, phenol-formaldehyde, urea/phenol-formaldehyde, and urea-formaldehyde resins as well as mixtures of these resins. Thus will be included the furan binder systems described in U.S. Pat. No. 3,346,534 and the phenolic and urea/phenolic binder systems described in U.S. Pat. Nos. 3,404,198 and 3,306,864. Included also are the less common resins such as the ketone-formaldehyde resin described in our pending application Ser. No. 307,720 and xylene-formaldehyde resins.

The resin should be in a liquid form so that it can be intimately reacted with the nitro compound. Accordingly, a number of the common organic solvents can be used as a diluent for the resin binder. Examples are naphtha and aromatic solvents such as benzene and toluene. Solvents compounds containing keto or aldehyde groups should not be used because of the reactivity of these groups with nitro compounds.

A number of nitro compounds having the standard formula

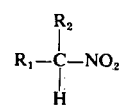

can be reacted with the resin binder. In this structural formula, H is hydrogen and $R_1$ and $R_2$ can be hydrogen, hydrocarbon radicals or members of the same ring. Preferably $R_1$ and $R_2$ are hydrogen, that is, the preferred nitro compound is nitromethane. Other suitable compounds are 1-nitropropane, 2-nitropropane and nitro cyclo compounds such as nitro cyclopentane and nitro cyclohexane.

The reduction of the formaldehyde content in the resin preferably is begun by adjusting the pH of the resin premixed with a desired amount of the nitro compound to a value above 7, or preferably between 8 to 10. or even more preferably to between 8.5 to 9. Inorganic bases which can be used include potassium or sodium hydroxide. Organic bases which can be used include primary, secondary and tertiary amines. Preferably tertiary amines are used. Specific amines which can be used are triethanol or triethyl amine, triethylene diamine, dimethyl ethanol amine and diethylene triamine. If the nitro compound used is nitromethane, up to about 1 mole weight of nitromethane for each 3 mole weights of free formaldehyde present in the resin is added. This is equivalent to adding up to about 68 parts by weight of nitromethane for each 100 parts by weight of free formaldehyde present. If the nitro compound used is one in which either $R_1$ or $R_2$ is hydrogen, then up to 1 mole of the nitro compound per 2 moles of free formaldehyde is added. If neither $R_1$ or $R_2$ is a hydrogen, then up to 1 mole of nitro compound per mole of formaldehyde should be added to effectively reduce free formaldehyde to low levels.

The reaction is conducted at atmospheric pressure and at temperatures between about 40°C and about 90°C for a period between about ½ and about 1 hour. Ordinarily if the pH of the reaction mixture is greater than 7, the reaction between the nitro compound and the free formaldehyde will proceed exothermally. The heat of reaction will increase the temperature of the reaction mixture to the preferred temperature range. When the reaction between the nitro compound and the formaldehyde is determined to be complete, the reaction product is cooled to room temperature. Completion of reaction is determined by periodically analyzing samples of the reaction mixture for free formaldehyde content. The product is then ready for use as a binder or further treatment with appropriate acids or bases to bring the pH to some level where the resin may be more stable, or to be mixed with other components to make a desired binder formulation. Conventional techniques can be followed in mixing the resin with sand and in adding other components such as accelerator catalysts useful in the hot-box and cold-box processes.

EXAMPLE 1

A furfuryl alcohol-modified urea formaldehyde resin containing approximately 15-18 percent by weight of free formaldehyde was treated according to the method of this invention. Five parts by weight of liquid nitromethane were added for each 100 parts by weight of furfuryl alcohol urea resin mixture. The pH of this solution was then adjusted to between 8.5 and 9.5 by adding triethanol amine. The temperature of the reaction mixture was maintained between 75° and 95°C for approximately 60 minutes. The reaction mixture then was allowed to cool to room temperature.

The same procedure was followed using nitromethane in ratios of 7, 10, and 12 parts by weight per 100 parts by weight of the same furfuryl alcohol-modified urea formaldehyde resin mixture in all cases the reaction pressure was atmospheric. Analysis of each of the treated resin samples for free formaldehyde yielded the following data:

Table I

|  |  |  |  |  |
|---|---|---|---|---|
| Weight percent free formaldehyde originally present in resin | 17.7 | 17.7 | 17.7 | 17.7 |
| Parts by weight of nitromethane added per 100 parts by weight of resin | 5 | 7 | 10 | 12 |
| Parts by weight of nitromethane added per 90 parts by weight of free formaldehyde | 25.4 | 35.6 | 50.8 | 61.0 |
| Weight percent of free formaldehyde remaining after reaction | 12.1 | 9.9 | 4.8 | 3.7 |
| Percent reduction of free formaldehyde | 31.6 | 44.0 | 72.9 | 79.1 |

From the foregoing analytical data it is readily apparent that nitromethane effectively reduced the free formaldehyde content of the resin.

EXAMPLE 2

The same procedure was followed again as in Example 1 except that in each of four tests nitromethane and the resin concentrate were reacted in a ratio of 10 parts by weight of nitromethane per 100 parts by weight of resin at room temperature and at pH values adjusted to 8, 8.3, 8.8, and 9.0. The amount of free formaldehyde was determined immediately after dissipation of heat of reaction and again after 48 hours. Results were as follows:

Table II

|  |  |  |  |  |
|---|---|---|---|---|
| Weight percent of formaldehyde originally present in resin. | 17.7 | 17.7 | 17.7 | 17.7 |
| Adjusted pH. | 8 | 8.3 | 8.8 | 9.0 |
| Weight percent of free formaldehyde after reaction. | 13.5 | 10.5 | 5.3 | 4.8 |
| Percent reduction. | 23.7 | 40.7 | 64.4 | 72.9 |
| Weight percent of free formaldehyde 48 hours after reaction. | 10.9 | — | 4.8 | 4.0 |
| Percent reduction. | 38.4 | — | 72.9 | 77.4 |

EXAMPLE 3

A low nitrogen "no-bake" furan resin binder containing 6.8 percent free formaldehyde was reacted in two runs with nitromethane in the ratios of 5 and 10 parts of nitromethane per 100 parts of no-bake resin binder at a temperature of 70°C and a pH of 8.3 for 12 minutes. The original free formaldehyde content of 6.8 weight percent in the resin was reduced to 5.2 percent and 4.5 respectively. This corresponds to a reduction in free formaldehyde content of 24 and 34 percent respectively.

EXAMPLE 4

A high-nitrogen-content furan hot-box resin was reacted in two separate runs with nitromethane in ratios of 5 and 10 parts by weight of nitromethane per 100 parts of resin binder. After the nitromethane was added, the pH of the mixture was adjusted to about 9 with triethanol amine. Each reaction was carried out at a temperature varying between 75° and 95°C for about 60 minutes. In the reaction utilizing 5 parts of nitromethane the free formaldehyde content was reduced from 8.45 to 4.55 parts per hundred by weight. In the reaction utilizing 10 parts of nitromethane the free formaldehyde content was reduced to 2.75 parts per hundred.

EXAMPLE 5

To a phenol-formaldehyde resin (resole type) containing approximately 9.4 weight percent of free (unreacted) formaldehyde was added 5 parts by weight of nitromethane per 100 parts of resin. Sufficient triethanol amine was then added to bring the pH to approximately 8.1. At the end of 90 minutes at approximately 70°C. the free formaldehyde content was reduced to 2.9. This corresponds to a reduction in free formaldehyde content of 69 percent.

EXAMPLE 7

In a procedure similar to that of Example 1, samples of a urea-formaldehyde resin containing approximately 22 percent free formaldehyde in two separate runs were treated with nitromethane in proportions of 10 parts and 15 parts of nitromethane per 100 parts by weight of resin. The corresponding reductions in free formaldehyde content were 34 and 64 percent respectively.

EXAMPLE 8

The effect on the strength of cores made with resin treated with nitromethane was tested. The resin of Example 1 was reacted under the same conditions of Example 1 with nitromethane in a ratio of 10 parts by weight of nitromethane per 100 parts of resin. The treated resin (Resin A in Table III) was then mixed with a phenol-formaldehyde resin (Resin B in Table III).

A foundry sand mix was then made up containing 1.5 parts of resin mixture (A, B, furfuryl alcohol, and silane in the ratios shown in Table III) per 100 parts by weight of Wedron silica sand. The catalyst was 34 parts by weight of an 80 percent aqueous phosphoric acid each per 100 parts of resin mix. The resulting foundry mix was formed into standard AFS tensile test samples using standard procedures. The tensile strengths of test specimens were measured and are tabulated in Table III.

Table III

| Run No. | 1 | 2 | 3 | 4 | 5 | 6 | 7 | 8 | 9 | 10 |
|---|---|---|---|---|---|---|---|---|---|---|
| Composition of Binder | | | | | | | | | | |
| Parts by weight of Resin A | 10 | 10 | 10 | 25 | 25 | 25 | 50 | 50 | 50 | 100 |
| Parts by weight of Resin B | None | 10 | 20 | None | 20 | 10 | None | 10 | 20 | None |
| Parts by weight of Furfuryl Alcohol added to A and B | 90 | 80 | 70 | 75 | 55 | 65 | 50 | 40 | 30 | — |
| Parts by weight of silane | 0.15 | 0.15 | 0.15 | 0.15 | 0.15 | 0.15 | 0.15 | 0.15 | 0.15 | 0.15 |
| Work time, minutes* | 30 | 28 | 23 | 40 | 27 | 24 | 35 | 24 | 20 | 27 |
| Tensile strength, psi, after | | | | | | | | | | |
| 2 hours | 301 | 191 | 127 | 296 | 206 | 276 | 356 | 232 | 183 | 255 |
| 4 hours | 344 | 229 | 167 | 367 | 224 | 325 | 408 | 285 | 202 | 298 |
| 24 hours | 406 | 330 | 251 | 391 | 303 | 371 | 463 | 244 | 218 | 450 |
| 24 + 1 | 305 | 261 | 170 | 344 | 241 | 336 | 322 | 191 | 109 | — |
| Hardness After 2 Hours | 83 | 82 | 78 | 89 | 77 | 81 | 90 | 82 | 80 | 84 |
| After 24 Hours | 85 | 85 | 83 | 92 | 78 | 82 | 93 | 85 | 83 | 91 |

*Strip time values were approximately twice the work time values

EXAMPLE 6

The furfuryl alcohol/urea formaldehyde resin of Example 1 was treated following the procedure of Example 1 in two separate tests with 1-nitropropane and 2-nitropropane in a weight ratio of 10 parts of nitropropane for each 100 parts by weight of resin. When the 1-nitropropane was used, the free formaldehyde content of the resin was reduced from 17.7 weight percent to 12.5 percent. This represents a 29.4 percent reduction. When the 2-nitropropane was used, the free formaldehyde concentration was reduced to 15.4 percent representing a 13 percent reduction. This test illustrates the advantage of using a nitro compound where $R_1$ and $R_2$ are both hydrogen in comparison to a compound where only $R_1$ or $R_2$ is hydrogen.

EXAMPLE 9

Samples of the high-nitrogen-content furan resin of Example 4 treated with 5- and 10-parts by weight nitromethane (Runs 11 and 12 respectively, Table IV) were tested in the manner described in Example 8. A foundry sand mix was made up containing 1.5 parts of binder per 100 parts by weight of Wedron silica sand as shown in Table IV. The catalyst was 34 parts by weight of 80 per cent aqueous phosphoric acid per 100 parts by weight of binder. The resulting foundry mix was formed into standard AFS tensile strength samples and tested for tensile strength and hardness. Samples of this same resin not treated with nitromethane but tested in the same manner are shown in Table IV as Runs 13 and 14.

TABLE IV

| Run No. | 11<br>5% n/methane | 12<br>10% n/methane | 13<br>non treated | 14 |
|---|---|---|---|---|
| Composition of Binder | | | | |
| Parts by weight of Resin | 50 | 50 | 50 | 40 |
| Parts by weight of Furfuryl Alcohol added to Resin | 50 | 50 | 50 | 60 |
| Work time, minutes* | 25 | 29 | 20 | 22 |
| Tensile strength, psi, after | | | | |
| 2 hours | 380 | 374 | 408 | 425 |
| 4 hours | 364 | 394 | 409 | 522 |
| 24 hours | 430 | 438 | 447 | 490 |
| 24 + 1 | 305 | 401 | 365 | 441 |
| Hardness after 2 hours | 91 | 87 | 91 | 94 |
| after 24 hours | 91 | 90 | 92 | 95 |

*Strip time values were approximately twice the work time values

Although the tensile strength of the test samples of Runs 11 and 12 are somewhat lower than those for the samples of Runs 13 and 14 these strengths are still sufficient for routine handling given foundry cores.

Although the nitro compounds can be used alone to minimize free formaldehyde in resin binder compositions, they can also be used in combination with other scavengers such as urea, ammonia, primary and secondary amines, resorcinol, and phenol. If these scavengers are used in combination with nitro compounds, we prefer to treat the resin compounds containing free formaldehyde with these other scavengers and then with the nitro compounds.

Although the foregoing description of our invention has been directed to resins used in making foundry cores, our invention is also adaptable to other arts, such as the adhesive and coatings arts, wherein a resin containing a minimized amount of free formaldehyde is desirable.

We claim:
1. A resin composition comprising:
   a. A foundry binder resin selected from the group consisting of furfuryl alcohol-formaldehyde, urea/furfuryl alcohol-formaldehyde, phenol/furfuryl alcohol-formaldehyde, phenol/urea/furfuryl alcohol-formaldehyde, phenol-formaldehyde, and urea/phenol-formaldehyde, and mixtures thereof, and
   b. the reaction product of free formaldehyde present in said resin and a nitro compound having the formula:

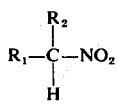

where C is carbon, N is nitrogen, O is oxygen, H is hydrogen, and $R_1$ and $R_2$ are selected from the group consisting of hydrogen, hydrocarbon radicals, and members of one ring.

2. The composition of claim 1 wherein the nitro compound is nitromethane present in a weight ratio of 90 parts of formaldehyde to between about 25 and about 61 parts by weight of nitromethane.

3. The composition of claim 2 wherein said resin is furfuryl alcohol/urea formaldehyde resin.

4. The composition of claim 2 wherein said resin is a furfuryl alcohol-formaldehyde resin.

5. The composition of claim 2 wherein said resin is a phenol-formaldehyde resin.

6. The composition of claim 1 wherein the mole ratio of nitro compound to originally present free formaldehyde is between about 1:3 and about 1:1.

7. The composition of claim 6 wherein the nitro compound is selected from the group consisting of 1- and 2-nitropropane.

8. A foundry mix comprising sand as the major constituent and a binding amount of up to about 10 percent by weight of sand of a thermosetting resin selected from the group consisting of furfuryl alcohol-formaldehyde, urea/furfuryl alcohol-formaldehyde, phenol/furfuryl alcohol-formaldehyde, phenol/urea/furfuryl alcohol-formaldehyde, phenol-formaldehyde, urea/phenol-formaldehyde, and mixtures thereof and containing the reaction product of free formaldehyde originally present in said resin and a nitro compound having the formula:

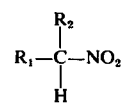

where C is carbon, N is nitrogen, O is oxygen, H is hydrogen, and $R_1$ and $R_2$ are selected from the group consisting of hydrogen, hydrocarbon radicals, and members of one ring, and the mole ratio of free formaldehyde to nitro compound is between about 3:1 and 1:1.

9. The composition of claim 8 wherein said nitro compound is selected from the group consisting of nitromethane, 1-, and 2-nitropropane in a mole ratio of nitro compound to free formaldehyde of between about 1:3 and about 1:1.

10. The composition of claim 9 wherein said resin is a furfuryl alcohol/urea formaldehyde resin.

11. The composition of claim 9 wherein said resin is a furfuryl alcohol-formaldehyde resin.

12. The composition of claim 9 wherein said resin is a phenol-formaldehyde resin.

13. The process of preparing shaped foundry products which comprises:
   a. forming a foundry mix by uniformly distributing on a foundry aggregate containing sand as the major constituent a binding amount of up to about 10 percent by weight of the weight of aggregate of a resin composition selected from the group consisting of furfuryl alcohol-formaldehyde, urea/furfuryl alcohol-formaldehyde, phenol/furfuryl alcohol-formaldehyde, phenol/urea/furfuryl alcohol-formaldehyde, phenol-formaldehyde, and urea/- phenol-formaldehyde, resins and mixtures thereof and containing the reaction product of free fromaldehyde originally present in said resin and a nitro compound having the formula:

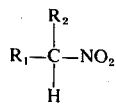

Where C is carbon, N is nitrogen, O is oxygen, H is hydrogen and $R_1$ and $R_2$ are selected from the group consisting of hydrogen, hydrocarbon radicals, and members of one ring.

b. shaping the foundry mix in a mold; and b. curing said shaped foundry mix.

14. The process of claim 13 wherein said nitro compound is selected from the group consisting of nitromethane, 1-, and 2-nitropropane.

15. The process of claim 14 wherein said nitro compound is nitromethane present in a weight ratio of 90 parts of formaldehyde to between about 25 and about 61 parts by weight of nitromethane.

16. The process of claim 14 wherein said nitro compound is present in a mole ratio of formaldehyde to nitromethane of up to about 3:1.

17. A process for minimizing the free formaldehyde content of a synthetic resin selected from the group consisting of furfuryl alcohol-formaldehyde, urea/furfuryl alcohol-formaldehyde, phenol/furfuryl alcohol-formaldehyde, phenol/urea/furfuryl alcohol-formaldehyde, phenol-formaldehyde, urea/phenol-formaldehyde resins and mixtures thereof comprising:

a. maintaining the pH value of said resin above about 7;

b. adding a nitro compound to said synthetic resin, said nitro compound having the formula:

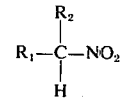

where C is carbon, N is nitrogen, O is oxygen, H is hydrogen, and $R_1$ and $R_2$ are selected from the group consisting of hydrogen, hydrocarbon radicals, and members of one ring; and c. allowing the reaction between nitro compound and formaldehyde to proceed to completion.

18. The process of claim 17 wherein the mole ratio of free formaldehyde to nitro compound is between about 3:1 and 1:1.

19. The process of claim 18 wherein said nitro compound is selected from the group consisting of nitromethane, 1-, and 2-nitropropane.

* * * * *